US009649545B2

(12) United States Patent
Dawe et al.

(10) Patent No.: US 9,649,545 B2
(45) Date of Patent: May 16, 2017

(54) GOLF SIMULATION SYSTEM WITH REFLECTIVE PROJECTILE MARKING

(71) Applicant: INTERACTIVE SPORTS TECHNOLOGIES INC., Vaughn, Ontario (CA)

(72) Inventors: Wayne Dawe, Richmond Hill (CA); Zuqiang Zhao, Richmond Hill (CA)

(73) Assignee: INTERACTIVE SPORTS TECHNOLOGIES INC., Vaughn, Ontario (CA)

( * ) Notice: Subject to any disclaimer, the term of this patent is extended or adjusted under 35 U.S.C. 154(b) by 0 days.

(21) Appl. No.: 14/953,647

(22) Filed: Nov. 30, 2015

(65) Prior Publication Data
US 2016/0074735 A1 Mar. 17, 2016

Related U.S. Application Data

(63) Continuation of application No. 13/123,321, filed as application No. PCT/CA2009/001424 on Oct. 7, 2009, now Pat. No. 9,199,153.

(Continued)

(51) Int. Cl.
*H04N 7/18* (2006.01)
*A63B 69/36* (2006.01)
(Continued)

(52) U.S. Cl.
CPC .......... *A63B 69/36* (2013.01); *A63B 24/0021* (2013.01); *A63B 69/3658* (2013.01);
(Continued)

(58) Field of Classification Search
CPC .............................. A63F 13/812; A63B 69/36
See application file for complete search history.

(56) References Cited

U.S. PATENT DOCUMENTS 3,729,315 A 4/1973 Conklin et al.
3,837,655 A 9/1974 Angelos
(Continued)

FOREIGN PATENT DOCUMENTS

EP 0 704 715 4/1996
EP 1 749 555 2/2007
(Continued)

OTHER PUBLICATIONS

Game Zone Online Tiger Woods PGA Tour 2003.
International Search Report and Written Opinion dated Jan. 11, 2010 in International Application No. PCT/CA2009/001424.

*Primary Examiner* — Jay Au Patel
*Assistant Examiner* — Irfan Habib
(74) *Attorney, Agent, or Firm* — Faegre Baker Daniels LLP

(57) ABSTRACT

A golf simulation system includes imaging devices capturing images of a projectile tracking region in front of a display surface from different vantages to detect a launched projectile traveling through the projectile tracking region towards the display surface. A projectile spin sensing unit captures images of a region at least partially overlapping with the projectile tracking region, and each captured image includes a projectile trail representing a travel path of the projectile. A processing stage receives data from the imaging devices and the projectile spin sensing unit and determines the three-dimensional positions, velocity, acceleration and spin of the projectile, and the three-dimensional positions, velocity, acceleration and spin are used by the processing stage to calculate a trajectory of the launched projectile into a presented golf scene.

23 Claims, 14 Drawing Sheets

Related U.S. Application Data

(60) Provisional application No. 61/103,790, filed on Oct. 8, 2008.

(51) Int. Cl.
  *G06F 3/047* (2006.01)
  *A63B 24/00* (2006.01)
  *A63B 71/06* (2006.01)
  *G06F 3/01* (2006.01)
  *G06K 9/32* (2006.01)
  *A63F 13/812* (2014.01)
  *A63F 13/213* (2014.01)

(52) U.S. Cl.
  CPC .............. *A63B 71/06* (2013.01); *G06F 3/017* (2013.01); *G06F 3/047* (2013.01); *G06K 9/3241* (2013.01); *H04N 7/18* (2013.01); *A63B 2024/0028* (2013.01); *A63B 2024/0031* (2013.01); *A63B 2024/0034* (2013.01); *A63B 2071/0636* (2013.01); *A63B 2207/02* (2013.01); *A63B 2220/05* (2013.01); *A63B 2220/13* (2013.01); *A63B 2220/20* (2013.01); *A63B 2220/30* (2013.01); *A63B 2220/35* (2013.01); *A63B 2220/62* (2013.01); *A63B 2220/806* (2013.01); *A63B 2220/807* (2013.01); *A63F 13/213* (2014.09); *A63F 13/812* (2014.09)

(56) References Cited

U.S. PATENT DOCUMENTS

| | | | |
|---|---|---|---|
| 4,150,825 A | 4/1979 | Wilson | |
| 4,160,942 A * | 7/1979 | Lynch | A63B 24/0021 359/443 |
| 4,805,159 A | 2/1989 | Negendank et al. | |
| 4,858,922 A | 8/1989 | Santavaci | |
| 5,111,410 A | 5/1992 | Nakayama et al. | |
| 5,221,082 A * | 6/1993 | Curshod | A63B 24/0021 434/252 |
| 5,226,660 A | 7/1993 | Curchod | |
| 5,333,874 A | 8/1994 | Arnold et al. | |
| 5,342,054 A | 8/1994 | Chang et al. | |
| 5,437,457 A | 8/1995 | Curchod | |
| 5,443,260 A | 8/1995 | Stewart et al. | |
| 5,649,706 A | 7/1997 | Treat, Jr. et al. | |
| 5,768,151 A | 6/1998 | Lowy et al. | |
| 5,796,474 A | 8/1998 | Squire et al. | |
| 5,846,139 A * | 12/1998 | Bair | A63B 24/0021 434/252 |
| 5,906,547 A | 5/1999 | Tynan | |
| 5,926,780 A | 7/1999 | Fox et al. | |
| 5,938,545 A | 8/1999 | Cooper et al. | |
| 5,984,794 A | 11/1999 | Miremadi | |
| 6,098,458 A | 8/2000 | French et al. | |
| 6,254,492 B1 | 7/2001 | Taggett | |
| 6,308,565 B1 | 10/2001 | French et al. | |
| 6,322,455 B1 | 11/2001 | Howey | |
| 6,514,081 B1 * | 2/2003 | Mengoli | A63B 24/0003 434/252 |
| 6,592,245 B1 * | 7/2003 | Tribelsky | B64F 1/007 362/259 |
| 7,038,764 B2 | 5/2006 | Lee | |
| 7,335,116 B2 | 2/2008 | Petrov | |
| 7,544,137 B2 * | 6/2009 | Richardson | A63B 24/0003 273/317.2 |
| 8,202,148 B2 * | 6/2012 | Young | A63B 24/0003 463/3 |
| 8,371,962 B2 * | 2/2013 | Solheim | A63B 24/0021 473/131 |
| 8,444,509 B2 * | 5/2013 | Swartz | A63B 24/0003 473/221 |
| 8,540,583 B2 * | 9/2013 | Leech | A63B 57/00 473/152 |
| 8,678,954 B2 * | 3/2014 | Anton | A63B 69/3623 473/168 |
| 9,211,439 B1 * | 12/2015 | Pedenko | A63B 24/0006 |
| 2002/0030742 A1 * | 3/2002 | Aman | A63B 24/0021 348/169 |
| 2002/0036617 A1 | 3/2002 | Pryor | |
| 2003/0088362 A1 | 5/2003 | Melero et al. | |
| 2003/0130054 A1 | 7/2003 | Bissonnette et al. | |
| 2005/0023763 A1 | 2/2005 | Richardson | |
| 2005/0159231 A1 | 7/2005 | Gobush | |
| 2006/0030429 A1 * | 2/2006 | Rankin | A63B 24/0003 473/407 |
| 2006/0063574 A1 * | 3/2006 | Richardson | A63B 24/0021 463/1 |
| 2006/0281572 A1 | 12/2006 | Gobush et al. | |
| 2007/0293331 A1 | 12/2007 | Tuxen | |

FOREIGN PATENT DOCUMENTS

| | | |
|---|---|---|
| GB | 2 005 549 | 4/1979 |
| WO | 03/104838 | 12/2003 |
| WO | 2007/146620 | 12/2007 |

\* cited by examiner

GOLF SIMULATION SYSTEM WITH REFLECTIVE PROJECTILE MARKING

CROSS-REFERENCE TO RELATED APPLICATIONS

This application is a continuation of U.S. patent application Ser. No. 13/123,321, entitled SPORTS SIMULATION SYSTEM, filed Oct. 7, 2009, which is a U.S. National Phase patent application based on International Application Serial No. PCT/CA2009/001424 filed Oct. 7, 2009, entitled "Sports Simulation System," which is based on U.S. Provisional Patent Application Ser. No. 61/103,790 filed on Oct. 8, 2008, the disclosures of which are incorporated herein by reference.

This application is related to U.S. patent application Ser. No. 10/629,945 filed on Jul. 30, 2003 for an invention entitled "Sports Simulation System", to U.S. patent application Ser. No. 11/195,017 filed on Aug. 2, 2005 for an invention entitled "Sports Simulation System" and to U.S. patent application Ser. No. 11/394,004 filed on Mar. 30, 2006 for an invention entitled "Sports Simulation System", the disclosures of which are incorporated herein by reference.

FIELD OF THE INVENTION

The present invention relates generally to entertainment systems and in particular to a sports simulation system.

BACKGROUND OF THE INVENTION

Sports simulation systems designed to simulate sports experiences are well known in the art. In many conventional sports simulation systems, a player propels a sports projectile such as a ball, puck, arrow, dart, etc. at a target image presented on a display screen. The motion of the sports projectile is detected and imaged and an extrapolation of the trajectory of the sports projectile is made. The extrapolated trajectory is then used to determine a sports result. The displayed image is in turn updated to reflect the sports result thereby to provide the player with visual feedback and simulate a sports experience.

The goal of all sports simulation systems is to provide the player with a realistic sports experience. As a result, many variations of sports simulation systems have been considered in attempts to simulate accurately "real-life" sports experiences. For example, U.S. Pat. No. 5,333,874 to Arnold et al. discloses a sports simulator having a housing and two arrays of infrared (IR) receivers and emitters positioned in the housing. A launch area is established near one end of the housing. A user can launch an object such as a golf ball located in the launch area and drive the golf ball into the housing through the planes defined by the arrays of IR emitters and against a screen positioned at one end of the housing. A computer is connected to the IR receivers, which detect the passage of the object through the respective planes. Based upon the signals from the IR receivers, the computer uses triangulation techniques to determine the horizontal and vertical position, as well as the velocity of the golf ball. The computer can also determine the spin of the golf ball and cause an image of the golf ball as it would have appeared traveling away from the golfer had it not encountered the screen to be displayed on the screen.

U.S. Pat. No. 5,443,260 to Stewart et al. discloses a baseball training and amusement apparatus that detects the speed and projected flight of a batted baseball. The apparatus includes a ball delivery device, a pair of detection planes, a computer and a video and simulation monitor. The detection planes are parallel to one another and are spaced apart by a distance such that a batted ball passing through the detection planes would be a fair ball in a real baseball game. Each detection plane includes a rigid frame that supports a pair of optical scanners and a pair of light sources. The optical scanners and light sources are positioned at opposite top corners of the rigid frame and are aimed downwardly into the region encompassed by the frame.

During use, the ball delivery apparatus delivers a baseball towards a player positioned in front of the detection planes. When the player strikes the baseball with a bat and the baseball travels through the detection planes, the optical scanners capture images of the baseball. The images are processed to determine the coordinates of the baseball as it passes through each of the detection planes as well as the velocity of the baseball. A simulated trajectory of the baseball is then calculated using the determined coordinate and velocity information. The simulated trajectory information is used to update the graphical images presented on the monitor so that the simulated flight of the batted baseball is displayed to the player thereby to simulate a batting experience.

U.S. Pat. No. 5,649,706 to Treat, Jr. et al. discloses a hunting simulator for in-flight detection of a launched missile such as an arrow. The hunting simulator includes a screen and a projector for projecting a moving target on the screen. Electromagnetic radiation emitters are positioned in front of the screen adjacent its opposite top corners and illuminate a plane in front of the screen. Sensors are also positioned adjacent the opposite top corners of the screen and are responsive to the electromagnetic radiation emitters. Retroreflective tape extends along opposite sides of the plane.

During use, when an arrow is launched at the screen and passes through the plane, the sensors detect the presence of the arrow and generate output. The output of the sensors is used to determine the coordinates of the arrow as well as the velocity of the arrow. A simulated trajectory of the arrow is then calculated and the graphical images presented on the screen are updated accordingly to reflect the flight of the launched arrow. In this manner, a hunting experience is simulated.

U.S. Pat. No. 5,768,151 to Lowy et al. discloses a system for determining the trajectory of an object in a sports simulator. The system includes a baseball throwing device to deliver a baseball towards a player area. A projector adjacent the player area presents images on a display screen that is positioned near the ball throwing device and in front of a batter. Video cameras are positioned in front of and on opposite sides of the anticipated trajectory of a hit baseball.

During use when a baseball delivered by the ball throwing device is hit by the batter and passes through the fields of the view of the video cameras, images of the baseball are captured and a streak showing the path of the baseball through the fields of view is determined. The streak is used to simulate the flight of the baseball and to update the image presented on the display screen thereby to simulate a batting experience.

Although the above references disclose sports simulation systems that capture images of launched projectiles and use the image data to simulate the flight of the launched projectiles, these sports simulation systems fail to provide "true to life" sports experiences as a result of the mechanisms used to track the path of the launched projectiles.

Above-incorporated U.S. Patent Application Publication No. US2006/0063574 to Richardson et al. discloses a sports simulation system comprising a projectile tracking apparatus having a display surface on which a three-dimensional sports scene is presented. The projectile tracking apparatus captures images of a projectile tracking region disposed in front of the display surface to detect a launched projectile traveling through the projectile tracking region towards the display surface. At least one processing stage communicates with the projectile tracking apparatus and is responsive to the data received from the projectile tracking apparatus to determine the three-dimensional positions, velocity, acceleration and spin of a detected projectile traveling through the projectile tracking region. The determined three-dimensional positions, velocity, acceleration and spin are used by the at least one processing stage to calculate a trajectory of the launched projectile into the three-dimensional sports scene. Updated image data is generated by the at least one processing stage that includes a simulation of the launched projectile into the three-dimensional sports scene following the calculated trajectory. A projection unit coupled to the at least one processing stage receives the image data from the at least one processing stage and presents the three-dimensional sports scene, including the simulation, on the display surface.

Although this sports simulation system provides a better and more realistic sports experience, in certain environments such as for example, during club fitting, teaching and swing analysis, more accurate simulations are desired. It is therefore an object of the present invention to provide a novel sports simulation system and a novel projectile tracking apparatus.

SUMMARY OF THE INVENTION

Accordingly in one aspect there is provided a sports simulation system comprising a projectile tracking apparatus comprising at least two imaging devices capturing images of a projectile tracking region disposed in front of a display surface from different vantages to detect a launched projectile traveling through said projectile tracking region towards said display surface; a projectile spin sensing unit capturing images of a region at least partially overlapping with said projectile tracking region, each captured image comprising a projectile trail representing a travel path of said projectile when a projectile is present in said region during image capture; and at least one processing stage receiving data from the imaging devices and said projectile spin sensing unit and determining the three-dimensional positions, velocity, acceleration and spin of a detected launched projectile traveling through said projectile tracking region, the three-dimensional positions, velocity, acceleration and spin being used by said at least one processing stage to calculate a trajectory of said launched projectile into a three-dimensional sports scene.

According to another aspect there is provided a sports simulation system comprising a projectile tracking apparatus including a frame encompassing a display surface on which a video sequence portraying a three-dimensional sports scene is presented; and at least one pair of digital camera devices mounted on said frame and having fields of view looking across and in front of said display surface that overlap and encompass a projectile tracking region, each of said digital camera devices including a first processor for processing image data and generating two-dimensional projectile coordinates when a projectile travels through said projectile tracking region and is captured in images acquired by said digital camera devices; a projectile spin sensing unit capturing images of a region at least partially overlapping with said projectile tracking region, each captured image comprising a projectile trail representing a travel path of said projectile when a projectile is present in said region during image capture; a host processor communicating with said digital camera devices and said projectile spin sensing unit, said host processor calculating a three-dimensional trajectory of said projectile taking into account projectile spin using the two-dimensional projectile coordinates received from each first processor and the image data output of said launch area sensing unit and outputting image data including said calculated three-dimensional trajectory; and a display unit receiving said image data and presenting said video sequence including a simulation of said calculated trajectory on said display surface.

According to yet another aspect there is provided a sports simulation system comprising: at least one pair of imaging devices having overlapping fields of view looking across and in front of a display surface from different vantages; a projectile spin sensing unit capturing images of a region in front of said display surface, each captured image comprising a projectile trail representing a travel path of said projectile when a projectile is present in said region during image capture; at least one processing stage processing image data from the imaging devices and from said projectile spin sensing unit and determining the three-dimensional positions, velocity, acceleration and spin of a detected launched projectile traveling through said overlapping fields of view, the three-dimensional positions, velocity, acceleration and spin being used by said at least one processing stage to calculate a trajectory of said launched projectile into a three-dimensional sports scene projected onto said display surface; and a projection unit presenting said three-dimensional sport scene on said display surface including a simulation of said projectile following said calculated trajectory.

BRIEF DESCRIPTION OF THE DRAWINGS

Embodiments will now be described more fully with reference to the accompanying drawings in which.

DETAILED DESCRIPTION OF THE PREFERRED EMBODIMENT

Figure 1:
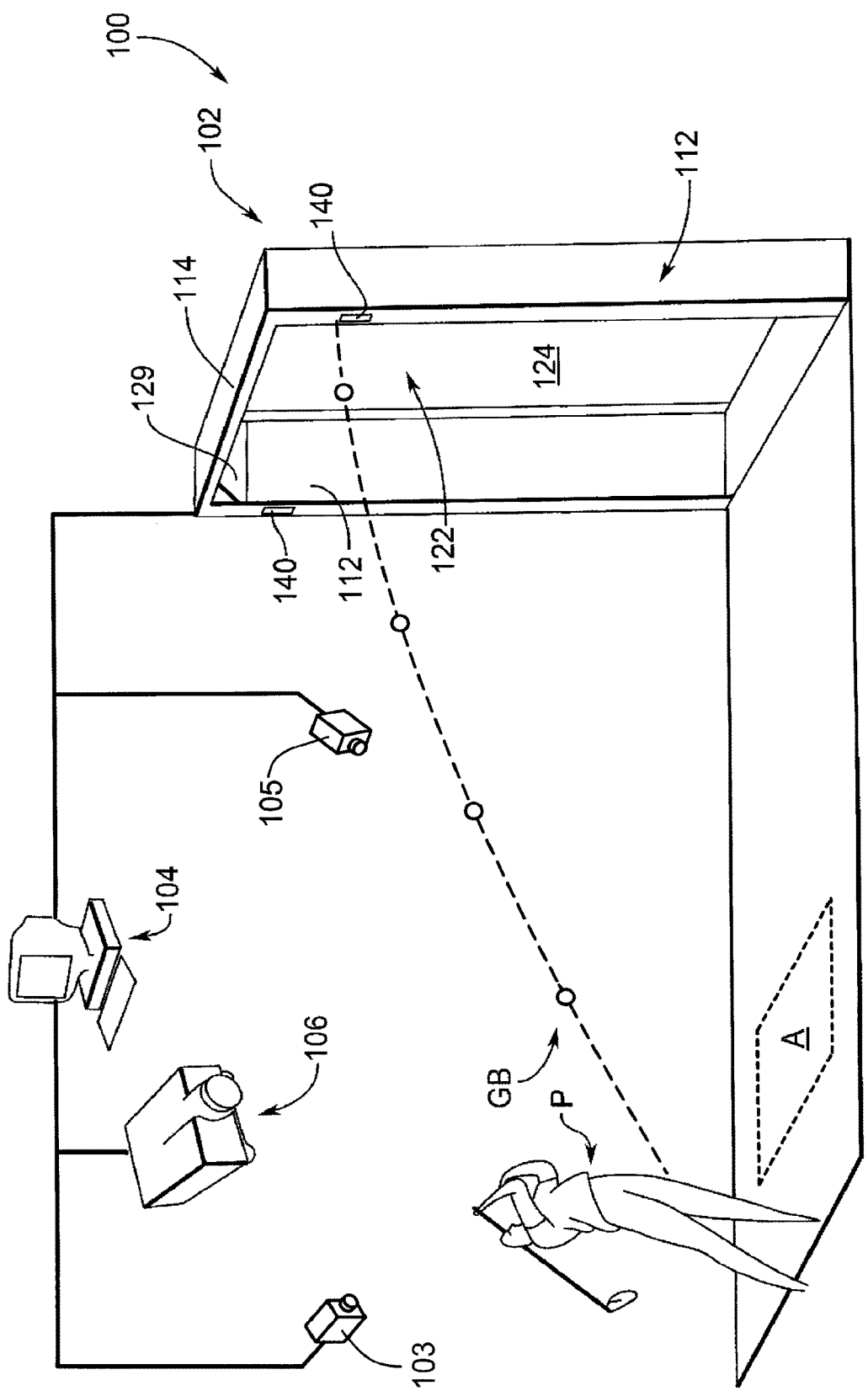
FIG. 1 is a perspective of a sports simulation system.
Figure 2:
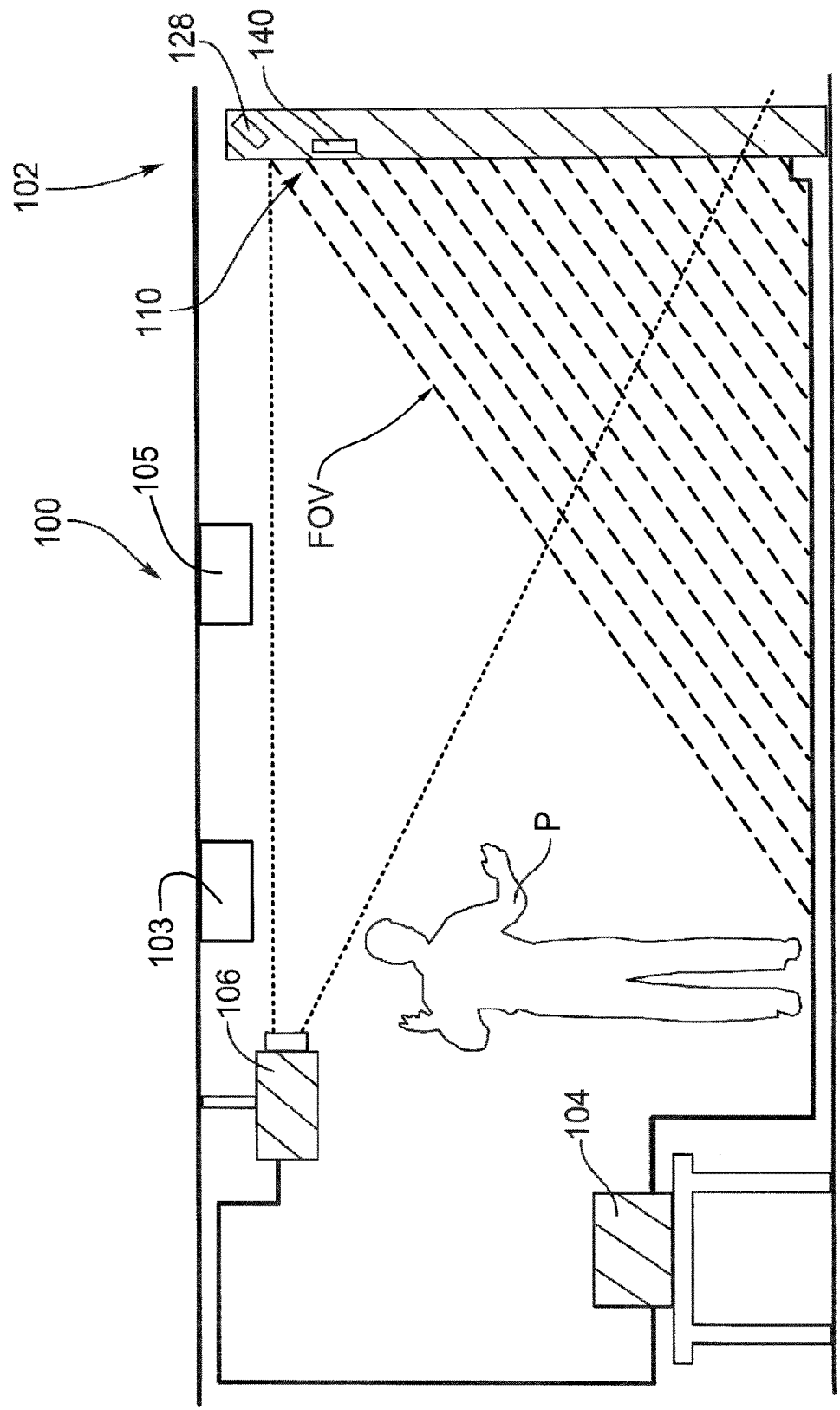
FIG. 2 is a side elevation view of the sports simulation system of FIG. 1.
Figure 3:
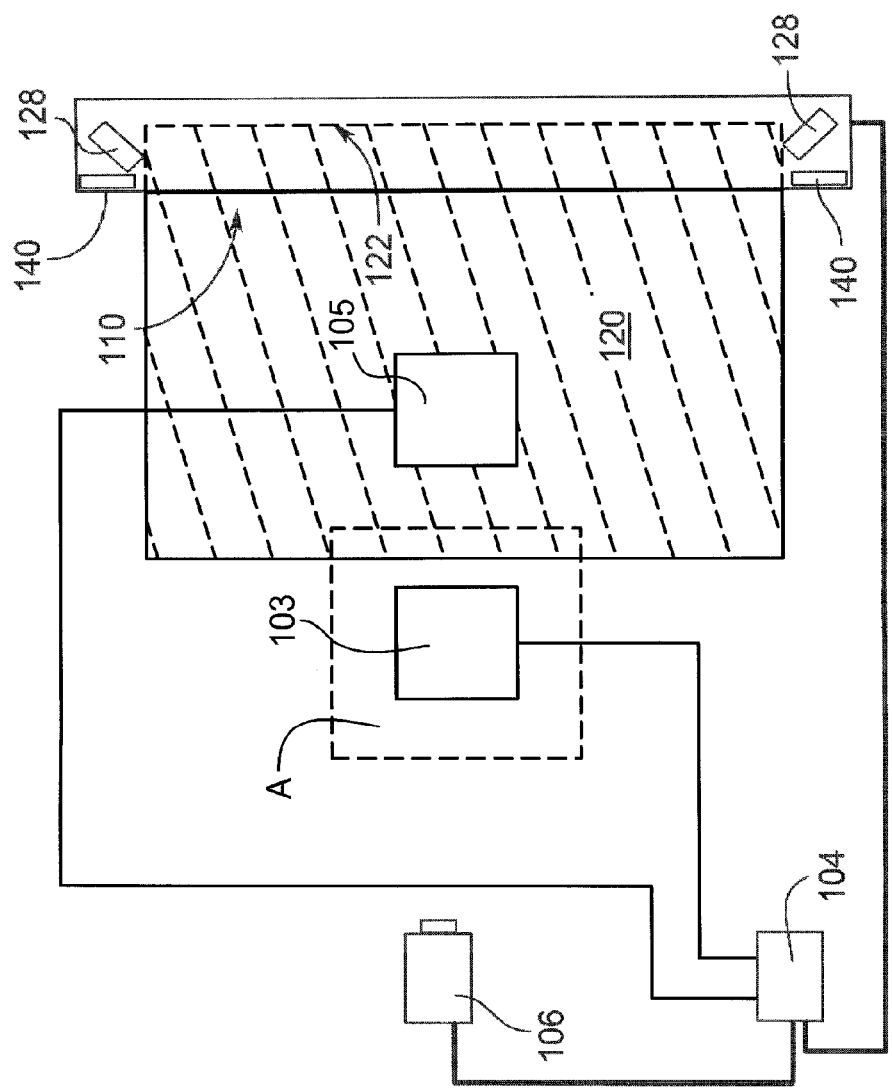
FIG. 3 is a top plan view of the sports simulation system of FIG. 1.
Figure 4:
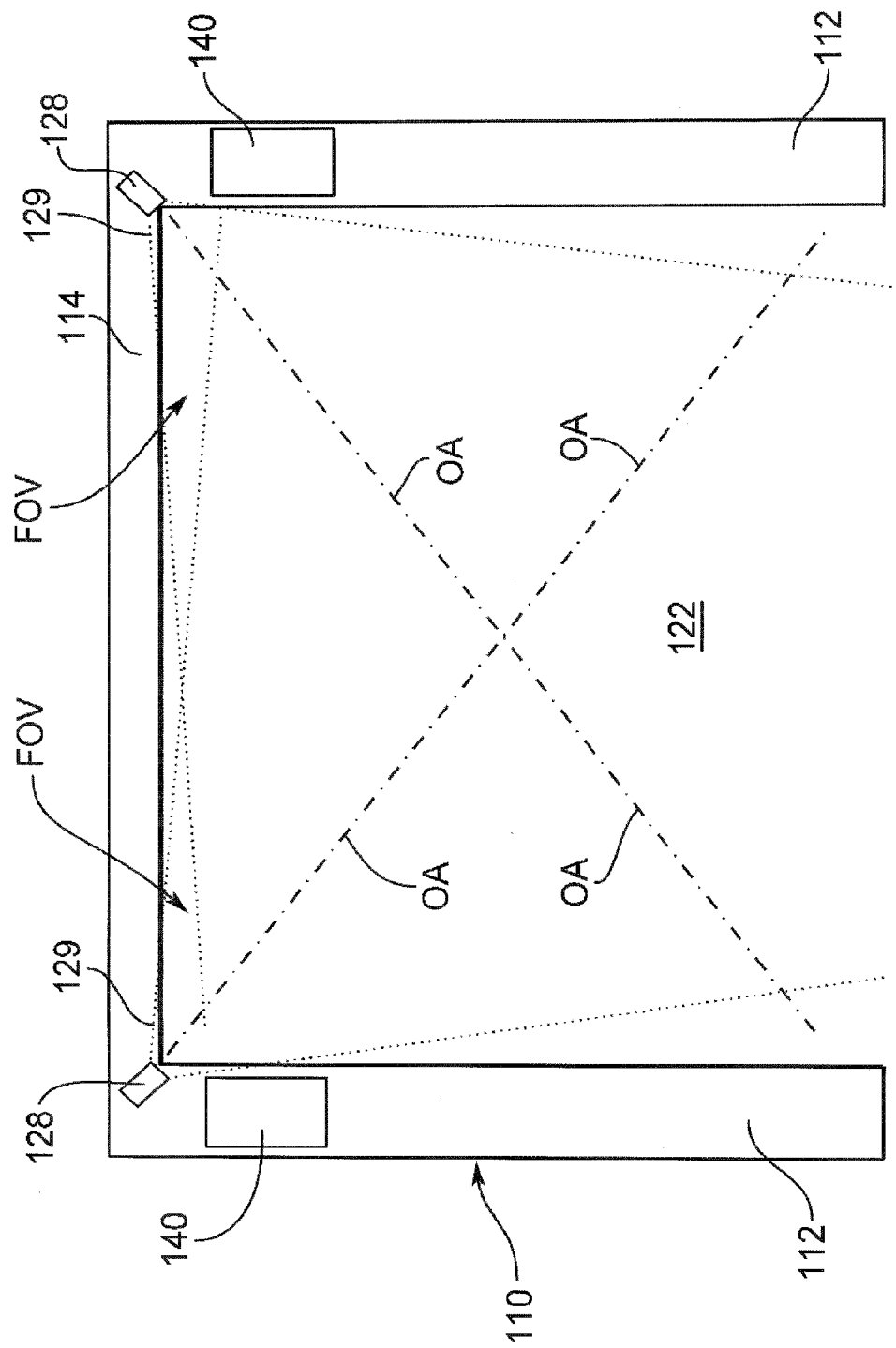
FIG. 4 is a front elevation view of a projectile tracking apparatus forming part of the sports simulation system of FIG. 1.
Figure 5:
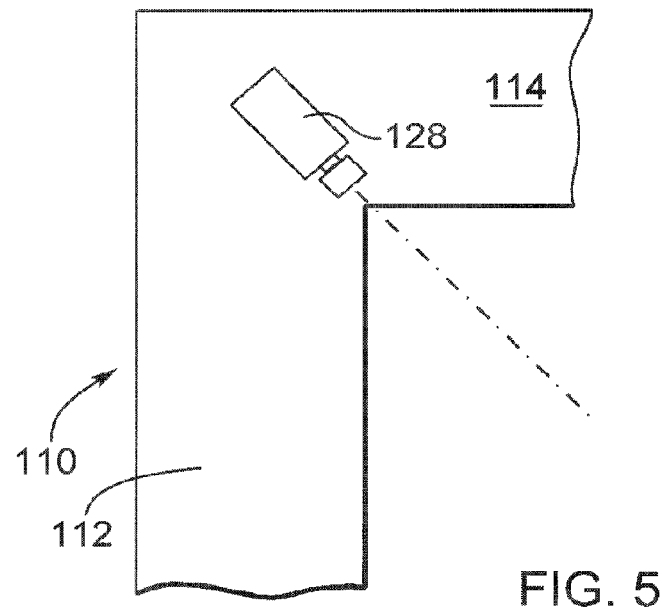
FIG. 5 is an enlarged front elevation view, partly in section, of a portion of the projectile tracking apparatus of FIG. 4.

Turning now to FIG. 1, a sports simulation system is shown and is generally identified by reference numeral 100. As can be seen, sports simulation system 100 includes a projectile tracking apparatus 102 disposed in front of a projectile launch or hitting area A in which a player P stands. In this embodiment, the separation distance between the launch area A and the projectile tracking apparatus is approximately ten (10) feet. An overhead projectile launch area sensing unit 103 is disposed above the launch area A. An overhead projectile spin sensing unit 105 is positioned between the launch area A and the projectile tracking apparatus 102. A host computer 104 is coupled to the projectile tracking apparatus 102, the projectile launch area sensing unit 103 and the projectile spin sensing unit 105 via a high-speed serial data link and to a ceiling mounted front video projector 106 that is aimed at the projectile tracking apparatus 102. The host computer 104 outputs video image data to the projector 106, which in turn projects a video sequence on the projectile tracking apparatus 102. The video sequence portrays a three-dimensional sports scene including a target at which a projectile is to be launched. In this embodiment, the sports simulation system 100 simulates golf and thus, the three-dimensional sports scene is golf related and comprises an image of a golf course hole, practice range etc. The projectile to be launched at the projectile tracking apparatus 102 of course is a golf ball GB.

The projectile tracking apparatus 102 outputs two-dimensional projectile position data to the host computer 104 when the launched golf ball GB travels through a projectile tracking region monitored by the projectile tracking apparatus. The projectile launch area sensing unit 103 outputs image data representing the motion of the golf club through the launch area A before, during and after impact with the golf ball to host computer 104. The projectile spin sensing unit 105 outputs image data to the host computer 104 that allows the host computer to determine the spin and the spin tilt axis of the golf ball GB as the golf ball travels through the projectile tracking region. The host computer 104 in turn processes the two-dimensional projectile position data, the projectile launch area sensing unit image data and the projectile spin sensing unit image data to determine the three-dimensional positions, launch velocity, acceleration, side spin, backspin, spin tilt axis and launch angle of the golf ball so that the trajectory of the golf ball can be accurately calculated. The calculated trajectory is then used to determine a sports result and to update the image data conveyed to the projector 106 so that the presented video sequence shows a simulation of the golf ball travel into the three-dimensional scene as well as the determined sports result.

FIGS. 2 to 5 better illustrate the projectile tracking apparatus 102. As can be seen, the projectile tracking apparatus 102 comprises an upright, inverted U-shaped frame 110 having a pair of side posts 112 and a crossbar 114 extending between the upper ends of the posts 112. A screen 122 is supported by the frame 110. In this embodiment, the screen 122 has a 4:3 aspect ratio making it particularly suited for displaying conventional television images. Those of skill in the art will however, appreciate that other image formats can be used. The screen 122 is loosely fastened to the back of the frame 110 at spaced locations.

The screen 122 includes multiple layers and is designed to reduce projectile bounce as well as enhance protection behind the screen. The first or front layer of the screen 122 is formed of highly reflective nylon having some elasticity to resist permanent stretching/pocketing and abrasion. As a result, the front layer provides an excellent display surface 124 on which images projected by the projector 106 are presented. The second or intermediate layer of the screen 122 is formed of soft and thick material and is designed to absorb projectile energy with reduced elastic effect thereby to inhibit stretching and or damage to the front layer. The third or back layer of the screen 122 is formed of a tough heavy canvas to which the intermediate layer can transfer energy. The back layer also inhibits excess deformation of the intermediate layer when contacted by a launched projectile. As a result, if the projectile tracking apparatus 102 is placed adjacent a wall surface or the like, the back layer protects the surface behind the screen 122 from projectile strike thereby to inhibit damage to the surface and/or significant projectile rebound. If a space is provided behind the projectile tracking apparatus 102, the back layer provides ample protection for the space.

Imaging devices, in this embodiment a pair of high speed digital cameras 128, are accommodated within the frame 110 with each camera being positioned adjacent a different top corner of the frame. Thus, the digital cameras 128 are positioned in front of the player P and to the left side and right side of the anticipated projectile path. The digital cameras 128 are also angled to point downwardly and towards the player position so that the fields of view of the digital cameras are generally perpendicular and overlap in the projectile tracking region which extends from the projectile launch point to the screen 122. In this manner, the path of the projectile can be tracked generally continuously from its launch point until it impacts the screen 122 and then as it rebounds from the screen 122.

In this embodiment, each digital camera 128 has at least a 640 by 480 pixel array and includes built-in processing capabilities comprising field programmable gate arrays, a high performance 32-bit microprocessor and high speed memory. The distributed processing capabilities achieved by using the digital cameras 128 and the host computer 104 allow the digital cameras to be operated at very high frame rates thereby allowing multiple images of a fast moving projectile to be captured as the projectile travels through the projectile tracking region 120. This is due to the fact that the digital cameras 128 need only send data to the host computer 104 relating to images in which projectile motion has been detected allowing high speed projectiles to be tracked without excessive bandwidth between the host computer 104 and the digital cameras 128 being needed. For example, in the case of a projectile travelling through the projectile tracking region 120 at a speed of 200 miles per hour, the frame rates of the digital cameras 128 are selected such that at least four images of the projectile are captured by each digital camera 128. The viewing angles of the digital cameras 128 and the dimensions of the frame 110 are selected to provide the digital cameras 128 with a resolving accuracy of approximately 1 mm per pixel. As a result, a small projectile such as a golf ball will activate approximately 12 pixels per image. This resolving accuracy enables even small, very fast moving launched projectiles to be readily determined in captured images and as a result, reduces false projectile detection.

The on-board microprocessor of each digital camera 128 executes a motion detection routine to determine if a projectile exists in the captured images and if so, whether the projectile satisfies specified motion detection parameters defining a projectile characteristic signature. The projectile characteristic signature is used to ensure the detected projectile has characteristics matching the projectile in question, in this case, a struck golf ball. The projectile can therefore be distinguished from other objects captured in the images such as for example, the golf club head. In this example, the projectile characteristic signature specifies allowable projectile size, shape, reflectivity and speed.

Infrared (IR) light emitting diode (LED) arrays (not shown) are also positioned within the posts 112 beside the digital cameras 128. The illumination axes of the IR LED arrays are generally coincident with the optical axes OA of the digital cameras. Each IR LED array emits IR radiation that is directed into the projectile tracking region 120. As the digital cameras 128 are responsive to both visible and infrared light, providing the background IR illumination allows the projectile tracking apparatus 102 to work well in a variety of ambient lighting conditions. In situations where a small fast moving projectile is launched, the IR illumination allows for detection of the projectile without interfering with the visual quality of the displayed image presented on the screen 122.

Audio speakers 140 are provided on the posts 112 and are aimed forwardly toward the launch area A. The audio speakers 140 are driven by an audio amplifier (not shown) accommodated within the frame 110. The audio amplifier receives audio input from the host computer 104 during play that is conveyed to the audio speakers 140 for broadcast thereby to enhance the sports experience.

Figure 6:
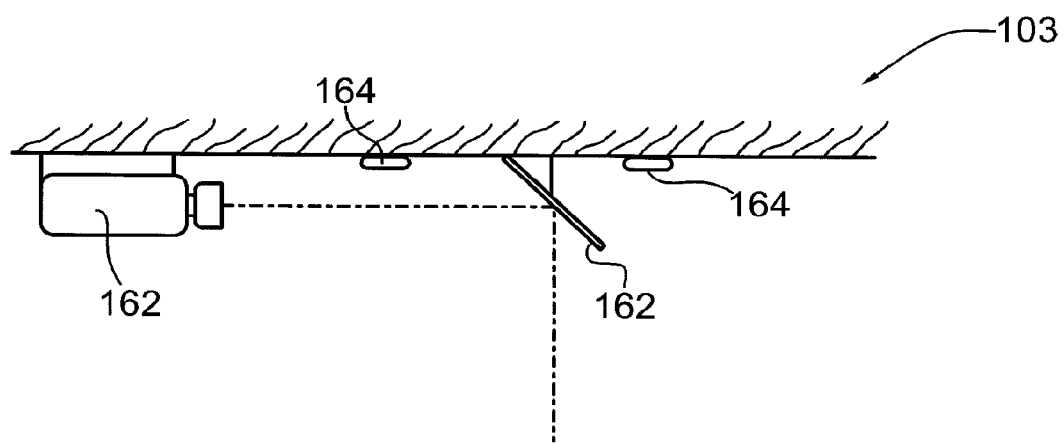
FIG. 6 is a side schematic view of a projectile launch area sensing unit forming part of the sports simulation system of FIG. 1.

The projectile launch area sensing unit 103 is disposed directly over the launch area A and comprises an area-scan digital camera 160, an angled mirror 162, a plurality of illuminators 164 in the form of halogen spotlights and a power supply (not shown) for the spotlights 164 as shown in FIG. 6. The spotlights 164 are aimed to provide sufficient illumination in the launch area A to permit image capture without adversely affecting visibility of the image projected on the screen 122. The area-scan digital camera 160 is ceiling mounted in a horizontal orientation approximately ten (10) feet above the launch area A. The optical axis of the digital camera 160 is generally in line with the center of the mirror 162 so that the field of view of the area-scan digital camera 160 is re-directed downwardly and centered over the launch area A. In this embodiment, the field of view of the area-scan digital camera 160 encompasses a three (3) foot by three (3) foot region.

Similar to the digital cameras 128 in the projectile tracking apparatus 102, the area-scan digital camera 160 comprises an on-board processor that executes a motion detection routine. During execution of the motion detection routine, as images are captured by the area-scan digital camera 160, the images are examined to determine if one or more moving objects exist therein that satisfy specified motion parameters. In this example, the motion parameters are selected to allow the on-board processor of the area-scan digital camera 160 to detect when either a moving golf club or moving golf ball or both is in captured images. Captured images including one or more moving objects satisfying the specified motion parameters are sent to the host computer 104 for further processing.

Figure 7:
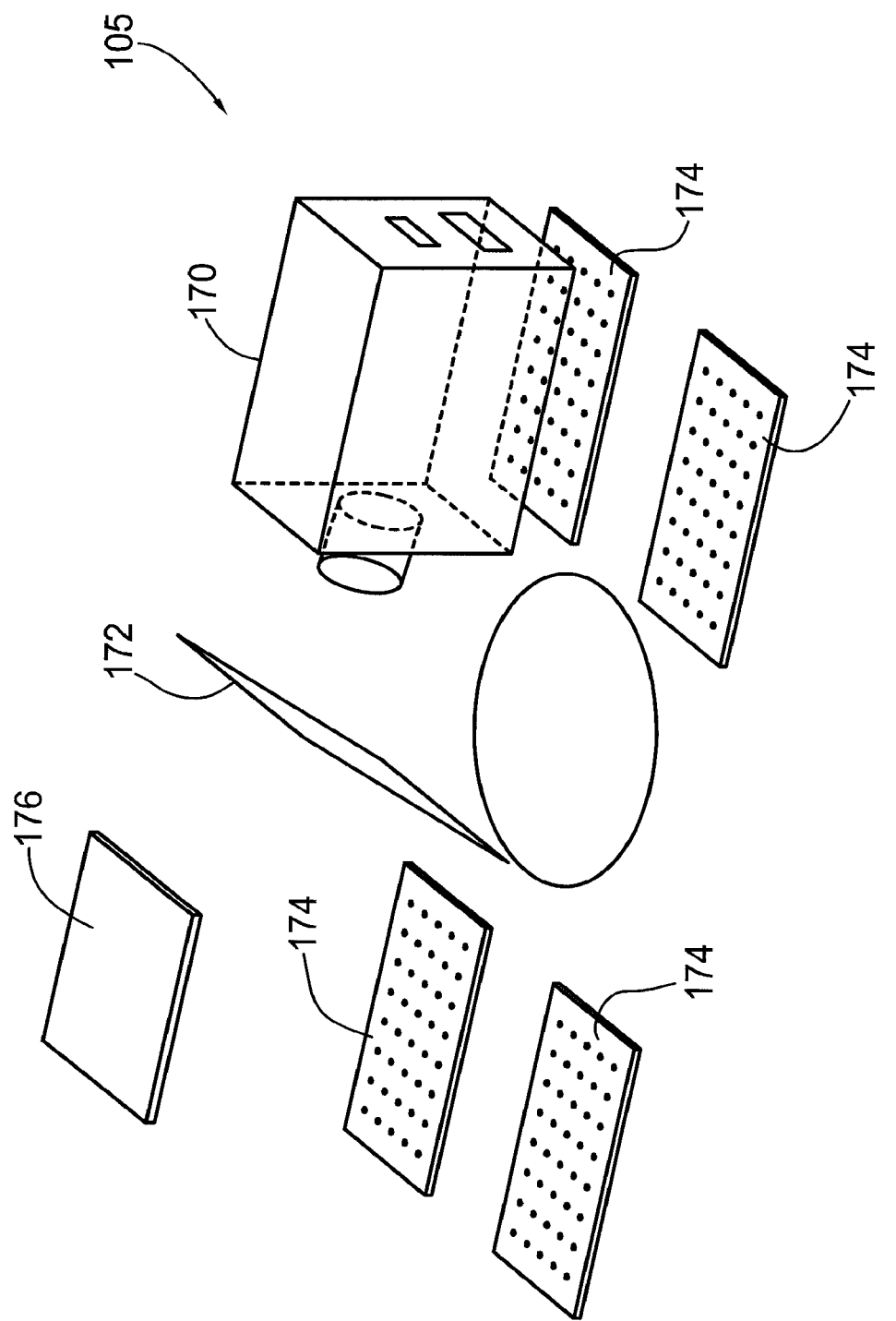
FIG. 7 is a schematic perspective view of a projectile spin sensing unit forming part of the sports simulation system of FIG. 1.

The projectile spin sensing unit 105 comprises a ceiling mounted, horizontally oriented area-scan digital camera 170, an angled mirror 172, a plurality of infrared (IR) illuminator boards 174 and a driver 176 for the illuminator boards 174 as shown in FIG. 7. The optical axis of the digital camera 170 is generally in line with the center of the mirror 172 so that the field of view of the digital camera 170 is re-directed and centered over a region that at least partially overlaps with the projectile tracking region. In this embodiment, the region extends from the front of the launch area A towards the projectile tracking apparatus 102 and encompasses a three (3) foot by six (6) foot region.

Figure 8:
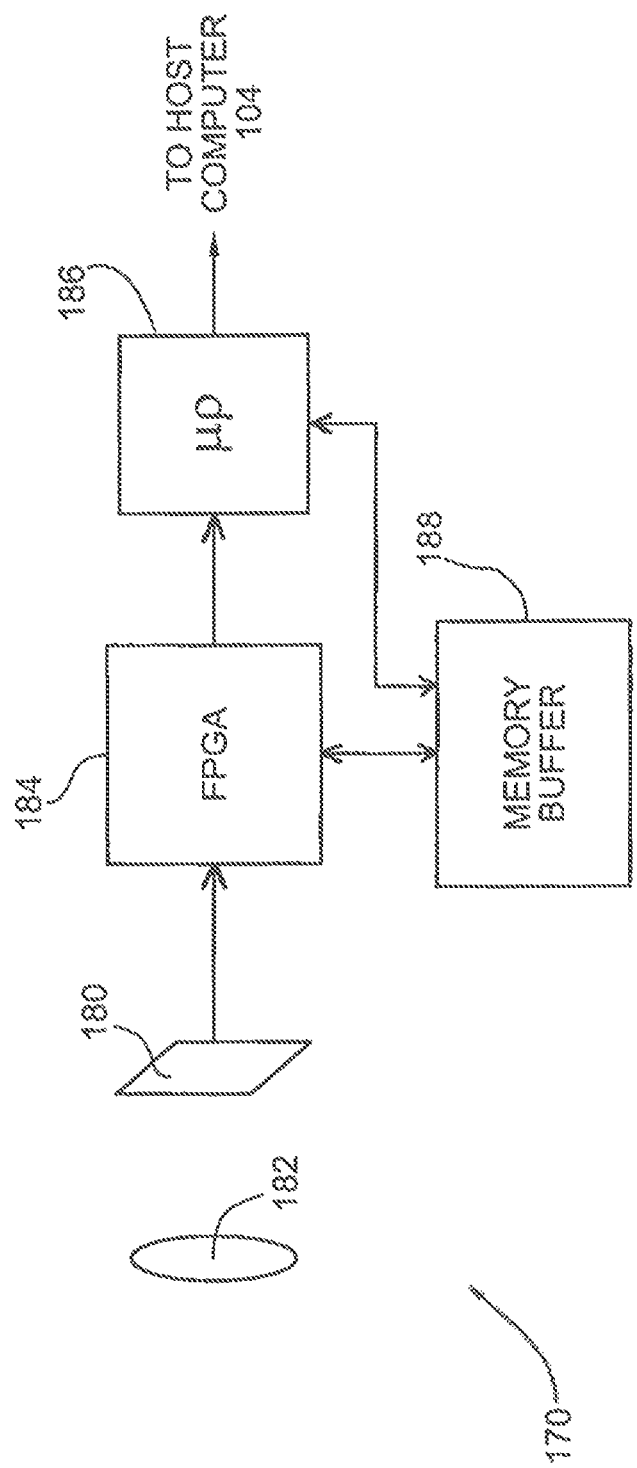
FIG. 8 is a schematic block diagram of an area-scan digital camera forming part of the projectile spin sensing unit of FIG. 7.
Figure 9:
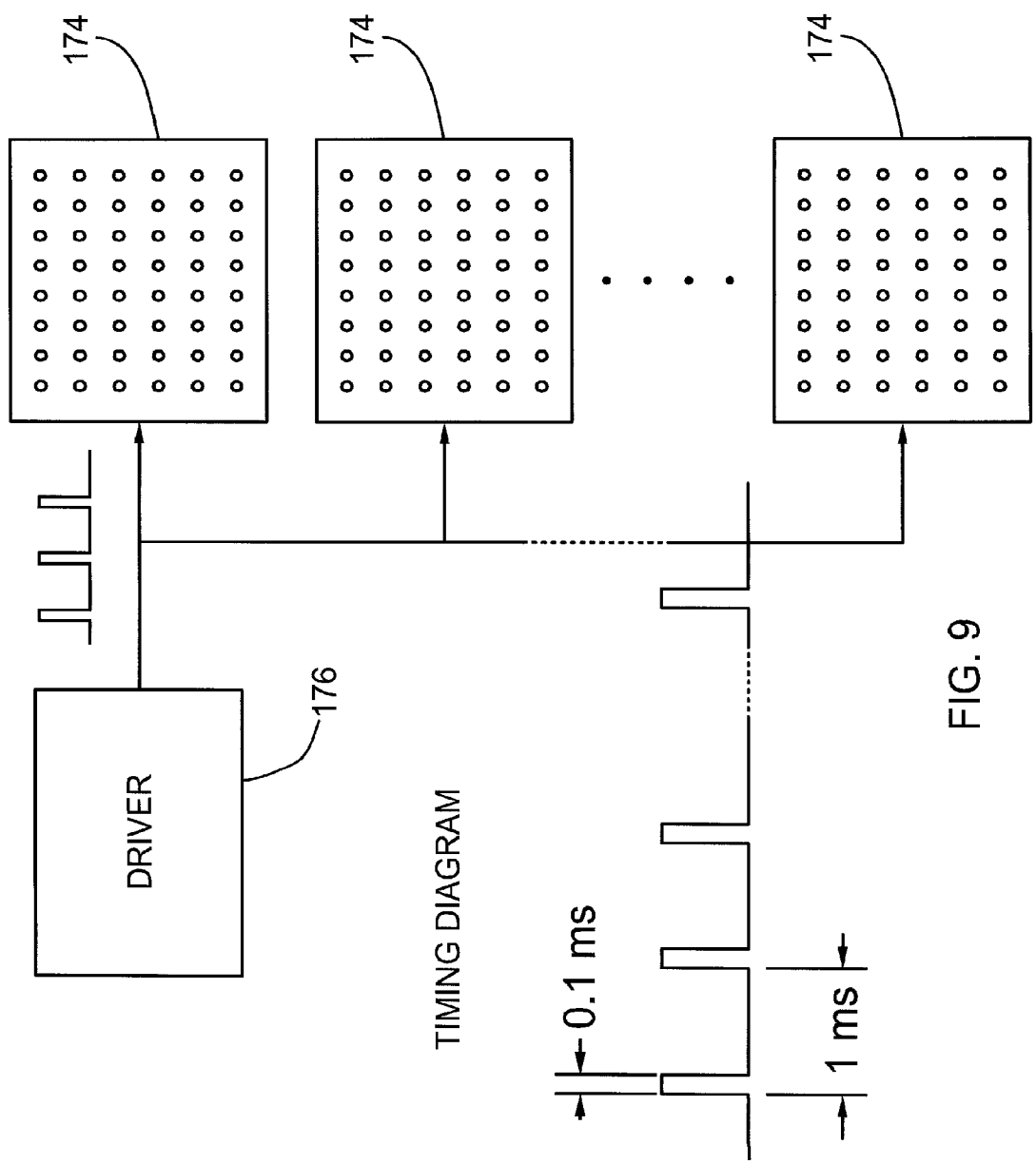
FIG. 9 is a schematic block diagram of an illumination board driver and illumination boards forming part of the projectile spin sensing unit of FIG. 7.

FIG. 8 better illustrates the area-scan digital camera 170. In this embodiment, the digital camera 170 comprises a CMOS image sensor 180 having a 640 by 480 pixel array and a pixel size equal to about 9.9 microns. The image sensor 180 looks through a lens 182 having a focus distance of about twelve (12) millimeters. Such a lens has been found to provide good area coverage while maintaining sufficient resolution. The digital camera 170 includes built-in processing capabilities comprising a field programmable gate array (FPGA) 184, a high performance microprocessor 186 and a high speed memory buffer 188.

In this embodiment, the projectile spin sensing unit 105 comprises four (4) illuminator boards 174, with each illuminator board comprising an array of light emitting diodes (LEDs). The illuminator boards 174 are arranged in a manner so that the region within the field of view of the digital camera 170 is generally evenly illuminated when the LEDs of the illuminator boards 174 are on. The driver 176 comprises a pulse generator that drives each of the illuminator boards 174 simultaneously so that the LEDs of the illuminator boards 174 turn on and off in unison at regular intervals. In this embodiment, the LEDs of the illuminator boards 174 remain in the on state for a 0.1 millisecond duration and remain in the off state for a 1 millisecond duration.

The projector 106 preferably has a resolution of at least 800×600, at least 1200 ANSI Lumens brightness, a short throw lens, vertical 'keystone' correction, and the capacity to accept digital RGB computer video signals, and NTSC/PAL baseband television video signals. Projectors having this set of features include the Epson Powerlite 820P, the Toshiba TDP-DI-US, the InFocus LP650 and the Sanyo XP30 for example.

The host computer 104 is a general purpose computing device. In this embodiment, host computer is an IBM compatible personal computer including an Intel Pentium® processor, at least 128 MB SDRAM, a high-speed hard drive, and a DVD player. The host computer 104 also includes a display adapter assembly including a reconfigurable 32-bit video memory buffer partitioned into three separate buffers. One of the buffers is used to store primary foreground image data representing one or more independent foreground action elements if appropriate for the sports scene being displayed. A second of the buffers is used to store background image data and the third buffer is used to store projectile trajectory image data. The display adapter assembly treats the foreground action, background and projectile trajectory image data as overlay image planes that are combined seamlessly to generate the video image data that is output to the projector 106. The overlay image planes are non-destructive so that when a foreground action element and/or projectile moves over an underlying image plane it is not necessary to redraw the underlying image plane. To reduce peak processing requirements, the host computer 104 updates the background image data less frequently than the foreground image data. The host computer 104 provides the output video image data to the projector 106 on a video output channel. The host computer 104 receives external video feeds on a television/satellite/cable input channel, a video game input channel and an Internet input channel.

The host computer 104 is mounted within a protective enclosure (not shown) having external connectors to enable the host computer 104 to be coupled to the projector 106, the projectile tracking apparatus 102, the projectile launch area sensing unit 103 and the projectile spin sensing unit 105. The enclosure also includes external connectors to allow the host computer 104 to receive the television/satellite/cable, external video game and Internet feeds. An interactive touch screen is also provided on the enclosure to allow a player to interact with the host computer 104.

A high speed digital serial interface, such as for example IEEE1394, is used for communications between the host computer 104, the projectile tracking apparatus 102, the projectile launch area sensing unit 103 and the projectile spin sensing unit 105. Using this standard interface provides a low cost, high performance solution while avoiding use of expensive analog frame grabbers. The interface also simplifies wiring as the digital cameras 128 can be daisy-chained without loss of signal integrity.

The host computer 104 executes sports simulation software stored in the SDRAM. In this example, the sports simulation software includes a golf simulation module that requires a player to hit the golf ball GB at the screen 122 of the projectile tracking apparatus 102 in response to the video sequence displayed on the screen 122.

To provide a realistic playing experience, a high resolution elevation map of the golf course terrain is used. The course terrain elevation map is constructed from a combination of two-dimensional images that include overhead satellite and/or aerial photographs used in conjunction with digital photographs taken from ground level. Using photogrammetry techniques, these orthogonal views are combined together. Using common points in the images i.e. edges of sand hazards, trees etc., a three-dimensional model is synthesized without requiring reference targets to be applied to the terrain of interest.

Figure 11:
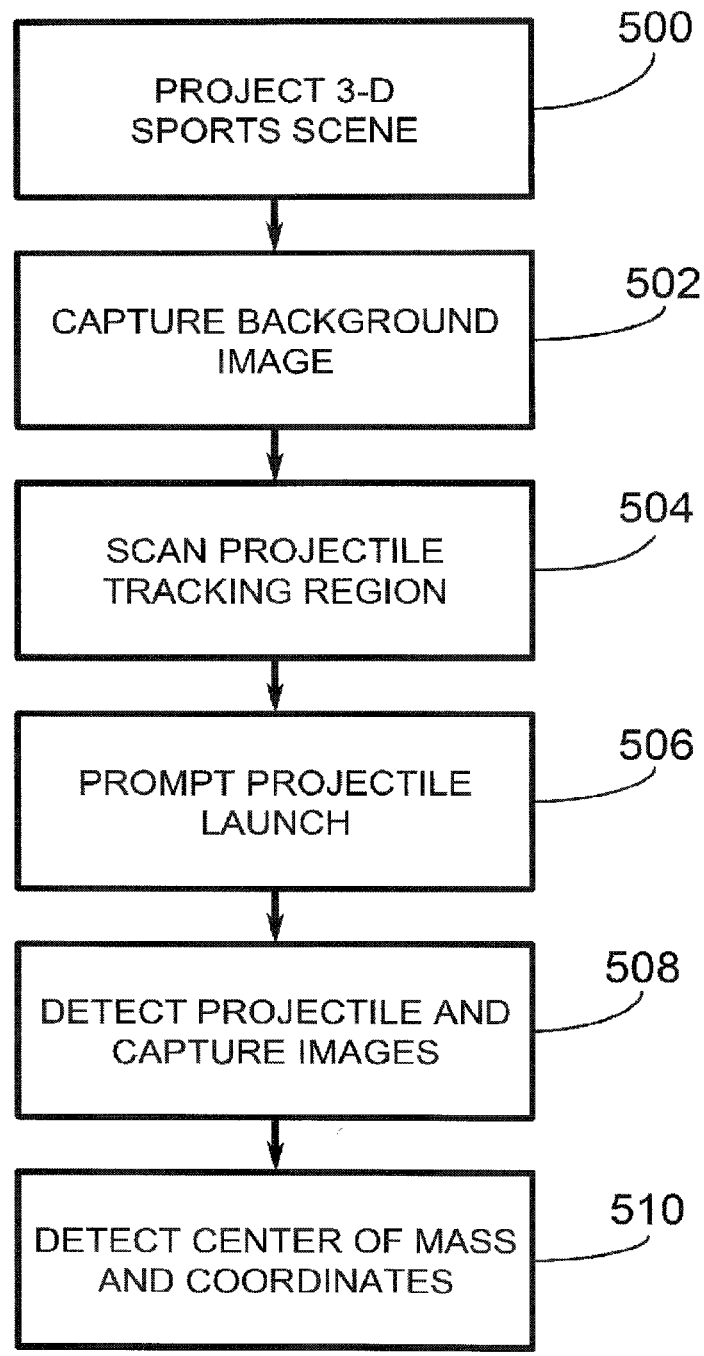
FIGS. 11 to 13b are flowcharts showing steps performed during player interaction with the sports simulation system of FIG. 1.

During training, practice or game play, the host computer 104 outputs video image data to the projector 106 causing the projector 106 to project a video sequence portraying a three-dimensional sports scene on the display surface 124 that includes a target at which the projectile is to be launched (see step 500 in FIG. 11). The host computer 104 also conditions the digital cameras 128 to capture a background image of the projectile tracking region 120 devoid of a projectile (step 502) and then scan the projectile tracking region to look for the presence of a launched projectile at a very high frame rate (step 504). The player is then prompted to launch the golf ball GB at the screen 122 (step 506). At this stage, the digital cameras 128, the area-scan digital camera 160 and the area-scan digital cameral 170 are conditioned to capture and process images.

Figure 10:
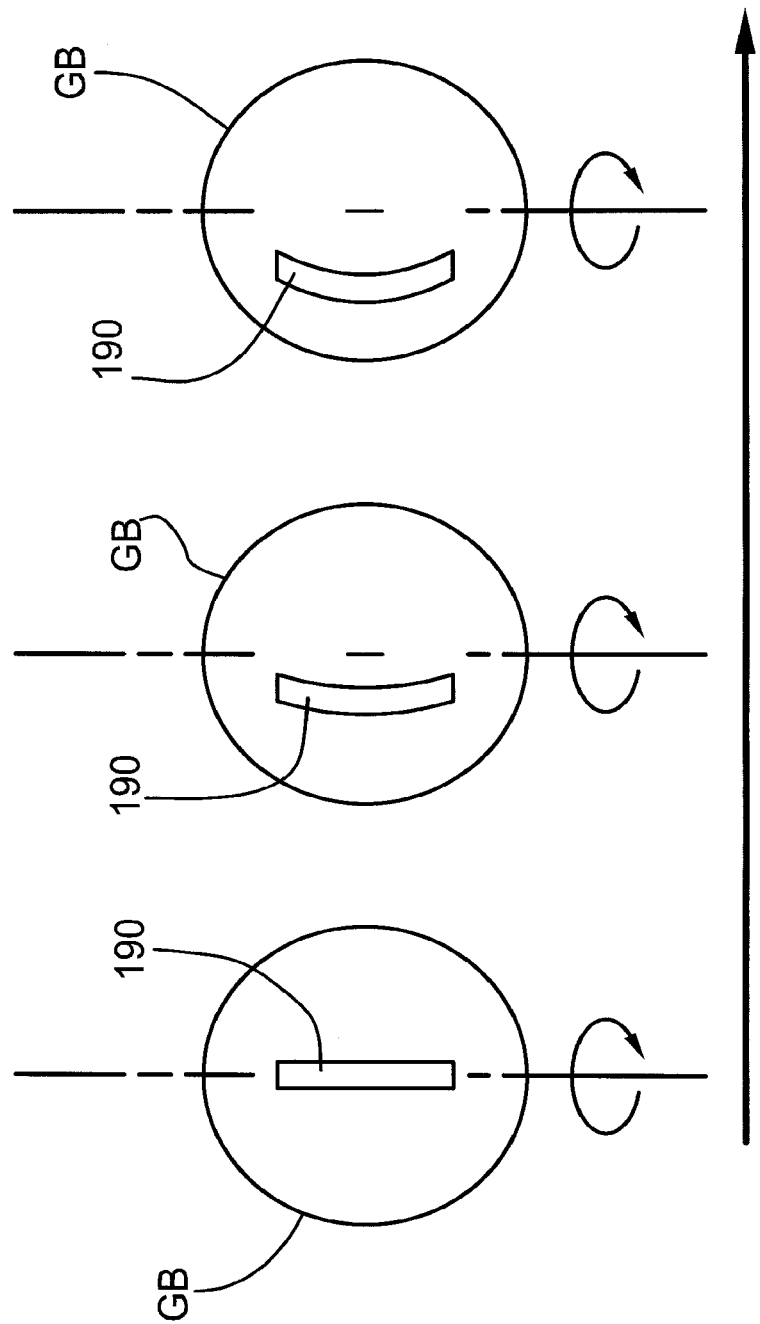
FIG. 10 shows a backward spinning launched golf ball.

To facilitate detection of golf ball spin, an elongate reflective or retroreflective marker 190 is provided on the golf ball GB (see FIG. 10). In this embodiment, the marker is a 45 mm by 5 mm piece of reflective tape adhered or otherwise secured to the golf ball GB. Prior to launch, the golf ball GB is preferably oriented so that the long dimension of the reflective tape 190 is parallel to the width of the screen 122. As a result, after launch and while the golf ball backspins as it travels through the field of view of the area-scan digital camera 170, when the driver 176 turns the LED arrays of the illuminator boards 174 on, the reflective tape 190 is clearly visible to the area-scan digital camera 170 at intervals.

When the player launches the projectile at the projectile tracking apparatus 102 by striking the golf ball with a golf club and the projectile enters the projectile tracking region 120, the projectile appears in the images captured by the digital cameras 128. Thus, the digital cameras 128 generally synchronously capture a series of images of the projectile as it travels from its launch point through the projectile tracking region 120 to its contact point with the screen 122 and then as the projectile rebounds off of the screen (step 508). The captured images are in turn processed by the on-board processors of the digital cameras 128 to determine if the captured images include a detected projectile satisfying the projectile characteristic signature.

If the detected projectile satisfies the projectile characteristic signature, the images are further processed to determine the center of mass of the projectile in each image and its position in rectangular coordinates (step 510). As a result, a series of two-dimensional rectangular coordinates representing the two-dimensional positions of the projectile as it travels through the projectile tracking region 120 relative to each digital camera 128 is generated. The two-dimensional rectangular coordinates generated by the digital cameras 128 are in turn conveyed to the host computer 104.

The area-scan digital camera 160 of the projectile launch area sensing unit 103 captures and processes images to look for the existence of a swinging golf club passing through the launch area A and the launched golf ball exiting the launch area A. When a swinging golf club and launched golf ball are detected, the area-scan digital camera 160 outputs the captured images to the host computer 104.

The area-scan digital camera 170 of the projectile spin sensing unit 105 captures images at a frame rate equal to about 100 frames per second (fps) and processes consecutive images to determine if the difference between consecutive images exceeds a threshold signifying the existence of an object in motion. When the difference between consecutive images exceeds the threshold, images are further processed to determine if the object in motion resembles a golf ball. If the object in motion resembles a golf ball, the images are sent to the host computer 104 for further processing.

Figure 12:
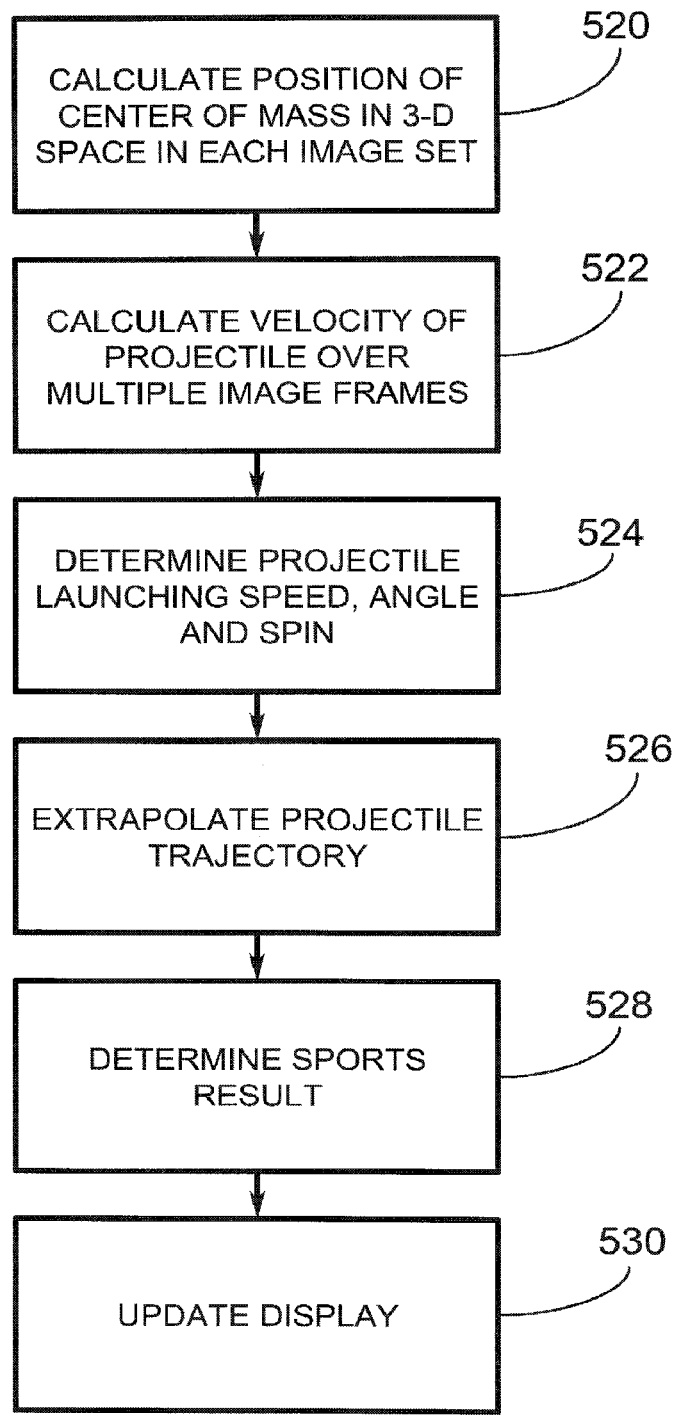

Upon receipt of the projectile coordinates from the projectile tracking apparatus 102, the host computer 104 calculates the positions of the projectile's center of mass in three-dimensional space throughout its travel through the projectile tracking region 120 including its collision and rebound with the screen 122 using triangulation techniques (see step 520 in FIG. 12). With the position of the projectile in three-dimensional space known during its travel through the projectile tracking region 120 and knowing the frame rates of the digital cameras 128, the host computer 104 calculates the launch velocity of the projectile and the velocity of the projectile over each image frame (step 522). The host computer 104 then compares each calculated velocity with the previously calculated velocity to determine the acceleration of the projectile (step 524).

Figure 14:
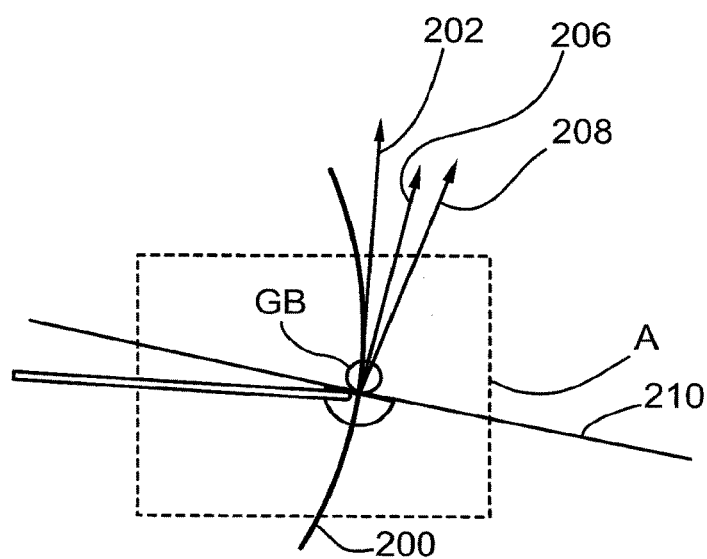
FIG. 14 is an overhead view of a golf club making impact with a golf ball within a launch area of the sports simulation system of FIG. 1.

Upon receipt of the image data from the projectile launch area sensing unit 103, the host computer 104 analyzes the club head swing path 200 (see FIG. 14) to determine where the club head hits the golf ball GB and to determine the initial golf ball trajectory or launch angle after being hit. The host computer 104 also defines a club head motion vector 202 as the tangent line along the club head swing path 200. By estimating the initial golf ball trajectory, a golf ball motion vector 206 is measured. Using this vector, a club face vector 208 can be determined as the line perpendicular to the tangent 210 of the club face at the impact point of the golf ball and the club face. By comparing the club head motion vector 202 and the club face vector 208, a determination can be made as to whether the club face is open or closed upon impact with the golf ball. The degree to which the club head motion vector 202 is not parallel to the club face vector 208 at the point of impact determines the amount of side spin that the golf ball will have. This enables the host computer 104 to calculate the side spin of the golf ball based on the angle of the club face at the point of contact with the golf ball as well as on the impact and rebound angles of the projectile with and from the screen 122 (also step 524).

Figure 13A:
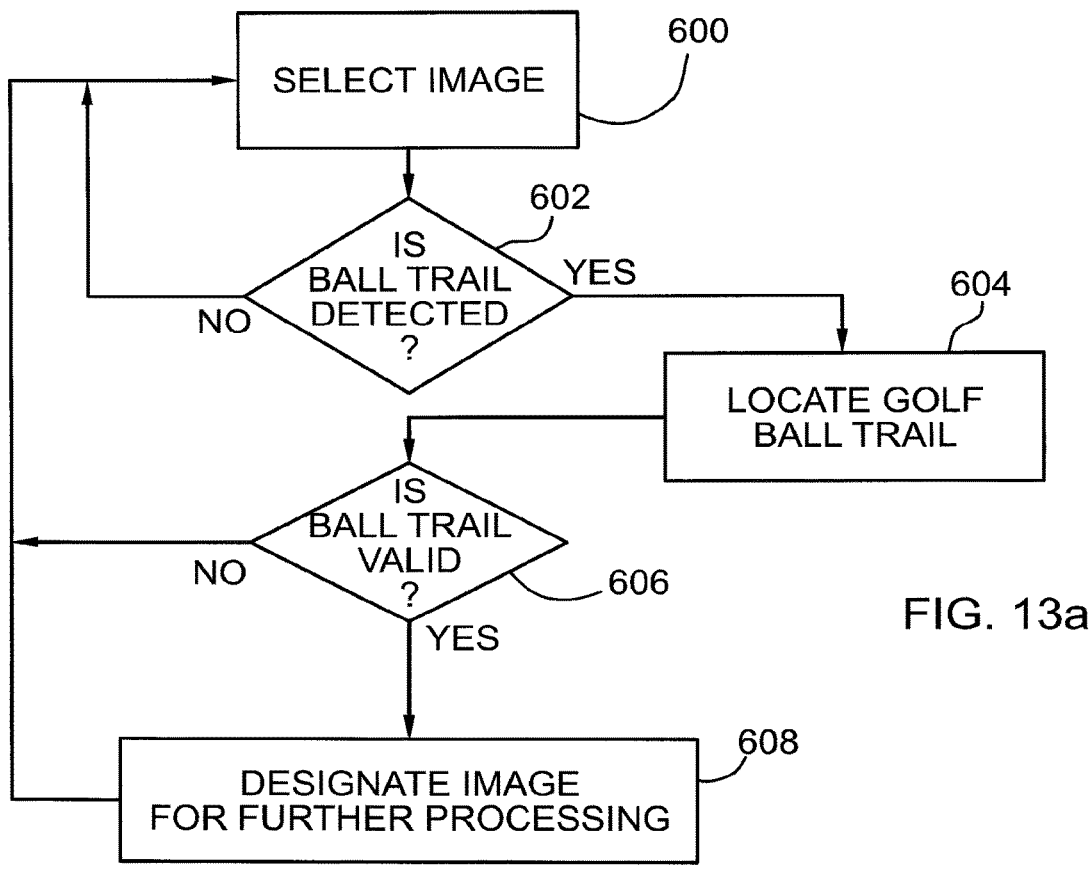
Figure 15:
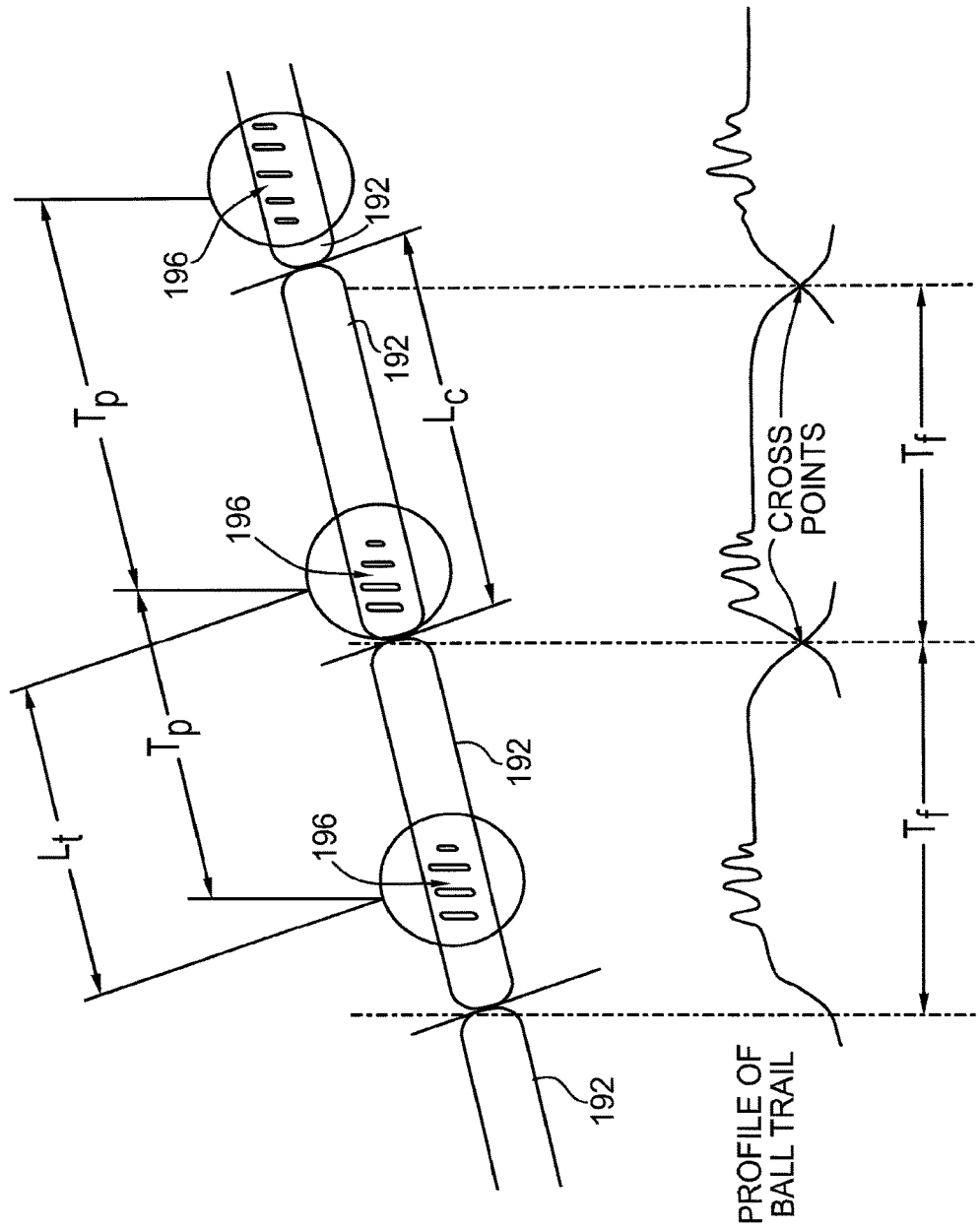
FIG. 15 shows processing of captured images to determine golf ball spin and golf ball spin tilt axis.

Upon receipt of the images from the projectile spin sensing unit 105, the host computer 104 selects the first image (see step 600 in FIG. 13a) and analyses the image to determine if the image includes a golf ball trail 192 (step 602) as shown in FIG. 15. The golf ball trail 192 appears in images due to the fact that velocity of the golf ball GB exceeds the frame rate of the digital camera 170. If the image does not include a golf ball trail, the image is discarded and the next image is selected at step 600. If the selected image includes a golf ball trail 192, the golf ball trail in the image is located (step 604) and is then examined to determine if it is valid (step 606). In particular, the length and width of the golf ball trail are compared with the threshold ranges. If the golf ball trail is not valid, the selected image is discarded and the next image is selected at step 600. If the golf ball trail 192 is validated at step 606, the image with the valid golf ball trail is designated for further processing (step 608) and the process reverts back to step 600 where the next image is selected.

Figure 13B:
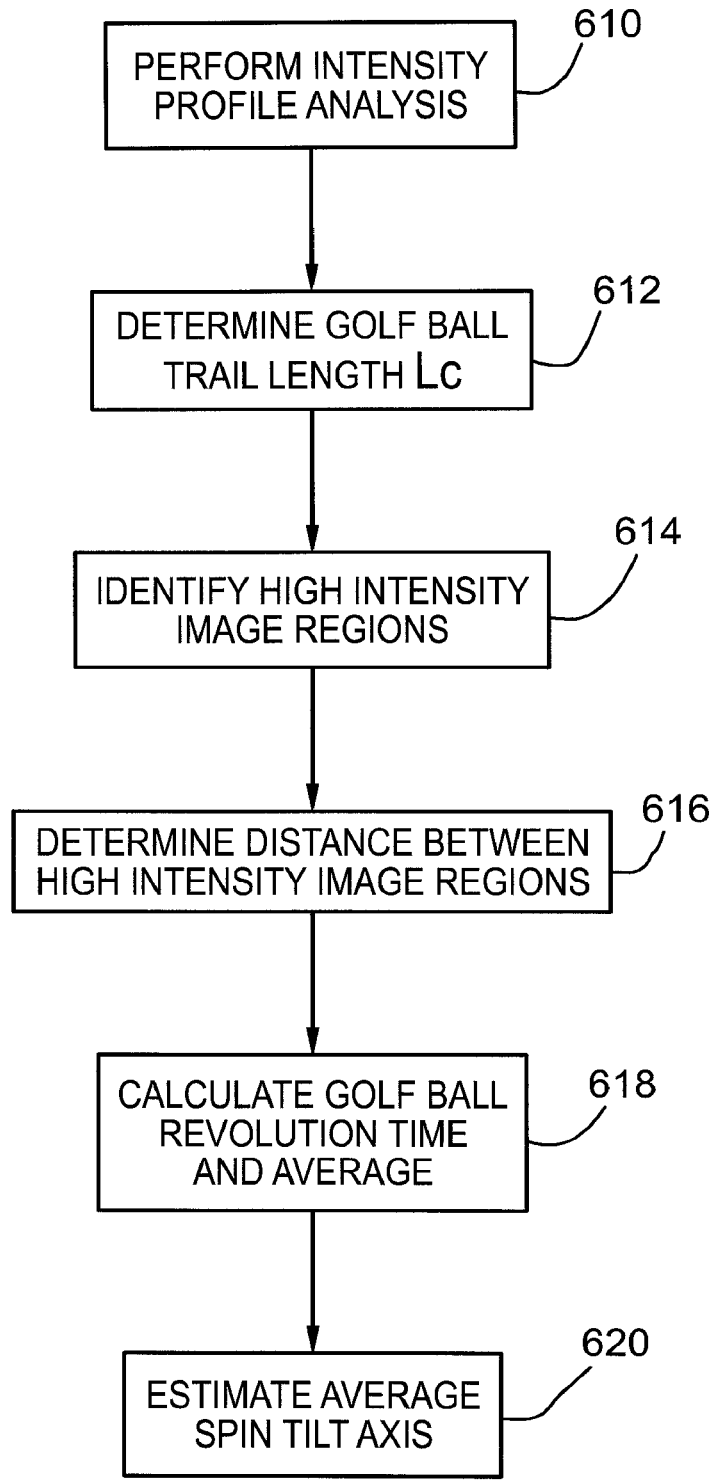

Once all of the images from the projectile spin sensing unit 105 have been selected and processed, the images designated for further processing at step 608 are subjected to an image intensity profile analysis (step 610 in FIG. 13b) thereby to generate a combined profile of the golf ball trail over consecutive images as shown in FIG. 15. The golf ball trail length $L_c$ per image is determined by the cross points of the combined profile (step 612). The images are subjected to adaptive thresholding to identify high intensity regions 196 in the images corresponding to the illuminated reflective tape 190 (step 614). A group of high intensity regions 196 corresponding to the reflective tape 190 appears in each image due to the golf ball spin and the pulsed illumination provided by the illuminator boards 174. The distance between the group of high intensity regions 196 in each consecutive image is then determined and is represented by $L_t$ in FIG. 15 (step 616). The time $T_p$ taken for the golf ball GB to make a single revolution is expressed as:

$$T_p = \frac{L_t}{L_c} \cdot T_f$$

where $T_f$ is the frame rate of the digital camera 170.

The time $T_p$ is calculated for each consecutive image designated for further processing at step 608 and the average single rotation time for the golf ball GB to make a signal revolution is determined (step 618). The average single rotation time is then converted into convenient units such as for example rotations per minute (rpms).

The ball spin tilt axis is then estimated for each image using the orientation of the high intensity regions 196 in each group and the relative angle between the longitudinal axis of the high intensity regions 196 and the longitudinal axis of the golf ball trail 192. The average ball spin tilt axis over the consecutive images designated for further processing at step 608 is then determined (step 620).

With the three-dimensional positions, launch velocity, acceleration, side spin, launch angle, backspin and spin tilt axis of the projectile known, the host computer 104 extrapolates an accurate trajectory for the projectile allowing a realistic simulation of curved and/or arcing projectiles to be generated (step 526). The computed projectile trajectory is then used to determine a sports result by computing the intersection of the calculated projectile trajectory with the displayed video image (step 528). With the projectile trajectory computed and the sports result determined, the host computer 104 updates the image data that is conveyed to the projector 106 so that the video sequence displayed on the display surface 124 of the screen 122 shows the simulated flight of the projectile and the sports result (step 530).

During video sequence display, when a simulation of the projectile flight is shown a graphical duplicate of the projectile is projected onto the display surface 124 of the screen 122 that begins its flight from the impact point of the projectile with the screen 122. In this manner, the projectile appears to continue its trajectory into the video scene thereby to achieve a realistic video effect. The three-dimensional scene is then updated in accordance with the sports result, allowing game play or practice to continue.

Although the sports simulation system 100 has been described as including a ceiling mounted front projector 106 in combination with a screen 122, those of skill in the art will appreciate that alternative projection devices may be used. For example, a rear video projector may be used to project images onto the rear surface of the display screen 122.

Those of skill in the art will appreciate that the projectile tracking apparatus 102 may include imaging devices at different locations to view the projectile tracking region and detect the existence of a launched projectile. Those of skill in the art will also appreciate that the number of processing stages may be increased or decreased as desired to handle processing of the digital camera image data effectively in real-time and provide a realistic projectile simulation.

If desired, the projectile launch area sensing unit 103 and the projectile spin sensing unit 105 may include additional cameras. The projectile launch area sensing unit 103 and projectile spin sensing unit 105 may include any number of illuminators or none at all if the ambient light conditions are sufficient to provide for adequate image capture. Further, although the projectile launch area sensing unit 103 and projectile spin sensing unit 105 are shown to include mirrors to re-direct the fields of view of the area-scan digital cameras 160 and 170, those of skill in the art will appreciate that the area-scan digital cameras may be oriented to look directly at the regions of interest. The projectile launch area sensing unit 103 and projectile spin sensing unit 105 may also be positioned at any convenient location.

Although the use of retroreflective tape on the golf ball is described, alternative markers on the golf ball may be used such as for example, retroreflective paint, highly reflective tape, highly reflective paint etc.

While the sports simulation system is described as simulating golf, it will be appreciated that the sports simulation system may be used to simulate other sports where a projectile is launched. In such cases, the projectile characteristic signatures are updated to enable launched projectiles to be accurately tracked.

Although embodiments have been described above with reference to the drawings, those of skill in the art will appreciate that variations and modifications may be made without departing from the spirit and scope thereof as defined by the appended claims.

What is claimed is:

1. A golf simulator comprising:
at least one pair of imaging devices having overlapping fields of view and configured to capture images from different vantages of a launched, spinning golf ball travelling from a launch area spaced in front of said display surface towards a display surface;
a sensing unit configured to capture images of a region in front of said display surface adjacent said launch area, each captured image comprising spaced-apart, high intensity regions resulting from one or more illuminated discrete, elongate, reflective markings on said launched, spinning golf ball representing a travel path of said launched, spinning golf ball, the high intensity regions enabling determination of the spin rate and tilt of said launched, spinning golf ball;
at least one processing stage configured to process image data from the imaging devices and from said sensing unit and to determine the three-dimensional positions, velocity, acceleration, and spin rate and tilt of the launched, spinning golf ball traveling through said overlapping fields of view, wherein the three-dimensional positions, velocity, acceleration, and spin rate and tilt are used by said at least one processing stage to calculate a trajectory of said launched, spinning golf ball into a sports scene projected onto said display surface; and
a projection unit configured to present said three-dimensional sport scene on said display surface including a simulation of said launched, spinning golf ball following said calculated trajectory.

2. A golf simulator according to claim 1 wherein said sensing unit comprises at least one imaging device having a field of view aimed downwardly toward said display surface.

3. A golf simulator according to claim 2 wherein said sensing unit further comprises at least one illuminator to illuminate the field of view of said at least one imaging device at intervals.

4. A golf simulator according to claim 3 wherein said at least one illuminator comprises an array of light sources.

5. A golf simulator according to claim 4 wherein said light sources are light emitting diodes.

6. A golf simulator according to claim 4 comprising a plurality of illuminators at spaced locations with said field of view.

7. A golf simulator according to claim 1 wherein during processing of image data from said spin sensing unit, said at least one processing stage is configured to generate a profile of the golf ball travel path over a plurality of images, determine the golf ball travel path length per image of said plurality of images, threshold each image to identify the high intensity regions corresponding to the one or more elongate, reflective markings on said launched, spinning golf ball, determine the distance between the high intensity regions in each image, calculate the spin rate and tilt of the launched, spinning golf ball using the determined distance, the golf ball travel path length and the spin sensing unit image frame rate and estimate a spin tilt axis of the golf ball using the orientation of the high intensity regions in each image and the relative angle between the longitudinal axis of the high intensity regions and the longitudinal axis of the golf ball travel path.

8. A golf simulation system comprising:
at least two digital camera devices having overlapping fields of view and capturing images from different vantages;
an overhead launch area sensing unit positioned above and aimed generally straight down onto a launch region positioned a distance in front of a display surface in which contact with a golf ball is made using a golf club and capturing images of said launch region, said overhead launch area sensing unit comprising at least one camera capturing images of said launch region and at least one illuminator adjacent said at least one camera, said at least one illuminator illuminating said launch region from above to illuminate one or more elongate, reflective markings on said golf ball;
at least one processing stage processing image data received from the camera devices and said overhead launch area sensing unit and determining the three-dimensional positions, velocity, acceleration and spin of a detected launched golf ball traveling from its launch point to said display surface, the three-dimensional positions, velocity, acceleration and spin being used by said at least one processing stage to calculate a trajectory of said launched golf ball into a golf scene projected onto said display surface, wherein during determination of the spin, said at least one processing stage processes the images captured by said overhead launch area sensing unit to determine the swing path of the golf club before, during and after contact with said golf ball, the launch angle of the golf ball after contact with said golf club, and the degree by which the head of the golf club is open or closed at the point of impact with the golf ball; and
a projection unit presenting said golf scene on said display surface including a simulation of said golf ball following said calculated trajectory.

9. A golf simulation system according to claim 8 wherein said at least one illuminator comprises a plurality of laterally spaced illuminators.

10. A golf simulation system according to claim 9 wherein said at least one camera comprises a single area-scan camera.

11. A golf simulation system according to claim 10 wherein said area-scan camera processes captured images to determine if one or more moving objects satisfying specified motion criteria are in the captured images, and if so outputs the captured images to said at least one processing stage.

12. A golf simulation system according to claim 10 wherein the optical axis of said area-scan camera is generally coincident with the center of said launch region.

13. A golf simulation system according to claim 12 wherein said area-scan camera is mounted in a generally horizontal orientation and wherein said launch area sensing unit further comprises a mirror to re-direct the field of view of said area-scan camera downwardly into said launch region.

14. A golf simulation system according to claim 8 wherein said at least one processing stage compares a club head motion vector with a club face vector to detect the degree by which the head of the golf club is open or closed.

15. A golf simulation system according to claim 14 wherein said at least one processing stage determines the tangent of the swing path at the point of impact to calculate said club head motion vector and determines a line perpendicular to the tangent of the face of the golf club at the point of impact to calculate the club face vector.

16. A golf simulation system according to claim 8 wherein the illumination provided by said at least one illuminator is sufficient for image capture without negatively affecting visibility of the golf scene presented on the display surface.

17. A golf simulator comprising:
a display surface on which a golf scene is presented;
a launch region spaced a distance from said display surface to define a golf ball travel region between said launch region and said display surface and configured to permit a user to launch a golf ball therefrom that travels through said golf ball travel region and impacts said display surface;
a launch area sensing unit above said launch region and comprising:
at least one camera mounted on said housing and capturing images of said launch region from directly above; and
at least one illuminator mounted on said housing adjacent said at least one camera, said at least one illuminator illuminating said launch region from above to illuminate one or more elongate, reflective markings on the golf ball to be launched from said launch region; and
at least one processor communicating with the launch area sensing unit and modifying the golf scene presented on said display surface in accordance with the trajectory of the golf ball launched at said display surface.

18. A golf simulator according to claim 17 wherein said at least one illuminator comprises a plurality of laterally spaced illuminators mounted on said housing.

19. A golf simulator according to claim 18 wherein said at least one camera comprises a single area-scan camera.

20. A golf simulator according to claim 19 wherein said area-scan camera processes captured images to determine if one or more moving objects satisfying specified motion criteria are in the captured images, and if so outputs the captured images to said at least one processor.

21. A golf simulator according to claim 19 wherein the optical axis of said area-scan camera is generally coincident with the center of said launch region.

22. A golf simulator according to claim 19 wherein said area-scan camera is mounted in a generally horizontal orientation and wherein said launch area sensing unit further comprises a mirror to re-direct the field of view of said area-scan camera downwardly into said launch region.

23. A golf simulator according to claim 17 wherein said launch area sensing unit comprises a housing configured to be mounted generally directly above said launch region.

* * * * *

UNITED STATES PATENT AND TRADEMARK OFFICE
CERTIFICATE OF CORRECTION

PATENT NO.        : 9,649,545 B2
APPLICATION NO.   : 14/953647
DATED             : May 16, 2017
INVENTOR(S)       : Wayne Dawe and Zuqiang Zhao Page 1 of 1

It is certified that error appears in the above-identified patent and that said Letters Patent is hereby corrected as shown below:

In the Claims

Claim 8, Column 14, Line 5, delete "generally"

Signed and Sealed this
Tenth Day of October, 2017

Joseph Matal
*Performing the Functions and Duties of the*
*Under Secretary of Commerce for Intellectual Property and*
*Director of the United States Patent and Trademark Office*